United States Patent
Tirone et al.

(10) Patent No.: US 11,067,087 B2
(45) Date of Patent: Jul. 20, 2021

(54) AXIAL-FAN BLOWER

(71) Applicant: BLACK & DECKER INC., New Britain, CT (US)

(72) Inventors: James C. Tirone, Baltimore, MD (US); Kelly E. Dyer, Silver Spring, MD (US); Oleksiy Sergyeyenko, Baldwin, MD (US)

(73) Assignee: Black & Decker, Inc., New Britain, CT (US)

( * ) Notice: Subject to any disclaimer, the term of this patent is extended or adjusted under 35 U.S.C. 154(b) by 370 days.

(21) Appl. No.: 15/059,956

(22) Filed: Mar. 3, 2016

(65) Prior Publication Data
US 2016/0265540 A1  Sep. 15, 2016

Related U.S. Application Data

(60) Provisional application No. 62/132,018, filed on Mar. 12, 2015.

(51) Int. Cl.
| | |
|---|---|
| *F04D 19/00* | (2006.01) |
| *A01G 20/47* | (2018.01) |
| *F04D 25/06* | (2006.01) |
| *F04D 25/08* | (2006.01) |
| *F04D 29/52* | (2006.01) |
| *F04D 29/54* | (2006.01) |

(52) U.S. Cl.
CPC .......... *F04D 19/002* (2013.01); *A01G 20/47* (2018.02); *F04D 25/0673* (2013.01); *F04D 25/084* (2013.01); *F04D 29/522* (2013.01); *F04D 29/545* (2013.01)

(58) Field of Classification Search
CPC .... F04D 19/002; F04D 29/545; F04D 25/084; F04D 25/0673; F04D 25/086; F04D 29/56; F04D 29/563; F04D 29/522; E01H 1/0809; E01H 1/0836; A01G 1/124; A01G 20/47; A47L 5/14
USPC .................................................. 239/525, 526
See application file for complete search history.

(56) References Cited

U.S. PATENT DOCUMENTS

| | | |
|---|---|---|
| 3,099,386 A | 7/1963 | Pieper |
| 4,132,507 A | 1/1979 | Akiyama et al. |
| 4,413,371 A | 11/1983 | Tuggle et al. |

(Continued)

FOREIGN PATENT DOCUMENTS

| | | | | |
|---|---|---|---|---|
| AU | WO 2014161048 A1 | * 10/2014 | ............. | B25F 5/006 |
| DE | 29519900 | 2/1996 | | |

(Continued)

OTHER PUBLICATIONS

"Cordless Electric Handhelds" www.cubcadet.com http://www.cubcadet.com/equipment/cubcadet/handhelds-and-cleanup/electric-and-cordless (Accessed Jan. 26, 2015).

(Continued)

*Primary Examiner* — Kenneth J Hansen
(74) *Attorney, Agent, or Firm* — John Yun

(57) ABSTRACT

An in-line blower having a housing with a substantially straight airflow path. A motor and fan are positioned within the airflow path, below the handle of the blower. A battery powers the motor, and is located below the housing so that the handle, motor and fan, and the battery are vertically aligned so the weight of the blower is aligned with the handle, and reduces moment forces acting thereon.

17 Claims, 9 Drawing Sheets

(56) References Cited

U.S. PATENT DOCUMENTS

| | | |
|---|---|---|
| 4,516,561 A | 5/1985 | Stawski et al. |
| 4,884,314 A | 12/1989 | Miner et al. |
| 4,945,604 A | 8/1990 | Miner et al. |
| 5,089,738 A | 2/1992 | Bergqvist |
| 5,586,359 A | 12/1996 | Iida |
| 5,806,133 A | 9/1998 | Iida |
| 6,105,206 A | 8/2000 | Tokumaru et al. |
| 6,141,823 A | 11/2000 | Fujiwara et al. |
| 6,216,961 B1 | 4/2001 | Utter et al. |
| 6,371,388 B2 | 4/2002 | Utter et al. |
| 6,442,790 B1 | 9/2002 | Svoboda et al. |
| D471,680 S | 3/2003 | Tokumaru et al. |
| 6,640,384 B2 | 11/2003 | Sanders et al. |
| 6,735,813 B2 | 5/2004 | Oohama |
| 6,921,285 B2 | 7/2005 | Glaunning |
| 7,337,492 B2 | 3/2008 | Matsuno et al. |
| D583,925 S | 12/2008 | Tinius |
| 7,739,773 B2 | 6/2010 | Schliemann et al. |
| 7,748,078 B2 | 7/2010 | Andriola et al. |
| 7,870,640 B2 | 1/2011 | Hinklin et al. |
| 7,896,612 B2 | 3/2011 | Schliemann et al. |
| 7,941,894 B1 | 5/2011 | Skorput |
| 8,015,661 B2 | 9/2011 | Baer et al. |
| D668,822 S | 10/2012 | Tinius |
| 8,387,204 B2 | 3/2013 | Dyson |
| 8,590,103 B2 | 11/2013 | Wolfe |
| 8,742,703 B2 | 6/2014 | Binder et al. |
| 8,806,705 B2 | 8/2014 | Minor |
| 8,894,382 B2 | 11/2014 | Binder |
| 8,918,956 B2 | 12/2014 | Pellenc |
| 2005/0058890 A1 | 3/2005 | Brazell |
| 2006/0288516 A1 | 12/2006 | Sawalski |
| 2008/0226971 A1 | 9/2008 | Stickel |
| 2011/0110798 A1* | 5/2011 | Tanimoto ............ F04D 25/0653 417/234 |
| 2011/0197389 A1 | 8/2011 | Ota et al. |
| 2012/0076672 A1 | 3/2012 | Binder |
| 2012/0201668 A1 | 8/2012 | Peterson et al. |
| 2013/0139348 A1 | 6/2013 | Otsuka et al. |
| 2013/0239361 A1* | 9/2013 | Pellenc ............... A01G 1/125 15/405 |
| 2014/0050600 A1 | 2/2014 | Kodato et al. |
| 2014/0140861 A1 | 5/2014 | Pellenc |
| 2014/0230181 A1 | 8/2014 | Yamaoka et al. |
| 2014/0234130 A1 | 8/2014 | Yamaoka et al. |

FOREIGN PATENT DOCUMENTS

| | | | |
|---|---|---|---|
| DE | 102006007972 | 9/2007 | |
| DE | 202014100753 | 6/2014 | |
| EP | 0792578 | 9/1997 | |
| EP | 0813838 | 12/1997 | |
| JP | S58157445 | 10/1983 | |
| JP | WO 2014030755 A1 * | 2/2014 | ............... A47L 5/14 |
| JP | WO 2014119181 A1 * | 8/2014 | ............. F04D 25/08 |
| WO | WO 2014/119181 | 12/2013 | |
| WO | WO2014030755 | 2/2014 | |
| WO | WO 2014/021116 | 6/2014 | |
| WO | WO2014119175 | 8/2014 | |
| WO | WO2014161048 | 10/2014 | |

OTHER PUBLICATIONS

"Handheld Blower Kit, Battery, Electric" www.grainger.com http://www.grainger.com/product/MAKITA-Handheld-Blower-Kit-20KR59.

"Husqvarna reconditioned 125B leaf blower" www.northerntool.com http://www.northerntool.com/shop/tools/product_200481414_200481414 (Accessed Jan. 26, 2015).

"Cub Cadet Handheld Leaf Blower" http://www.cubcadet.com/equipment/cubcadet/handhelds-and-cleanup/leaf-blowers/bv-228 (Accessed Jan. 26, 2015).

EP Search Report dated Aug. 10, 2016, for Application No. 16160011.9.

* cited by examiner

OFF (SITTING ON GROUND)  OFF (IN USERS HAND)
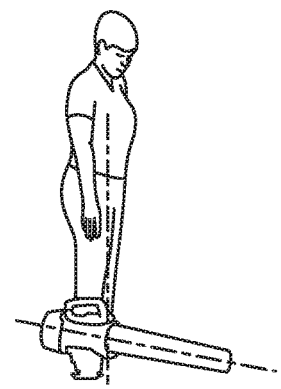 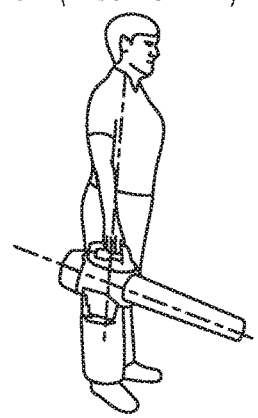
FIG. 7A
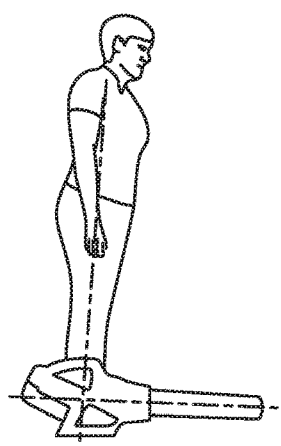 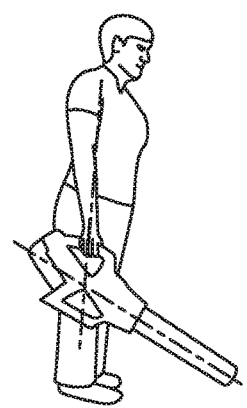
FIG. 7B
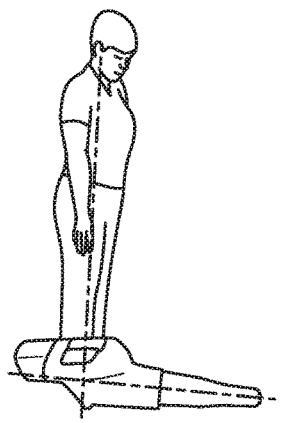 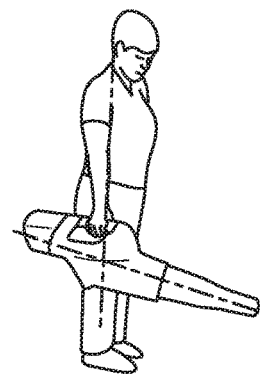
FIG. 7C
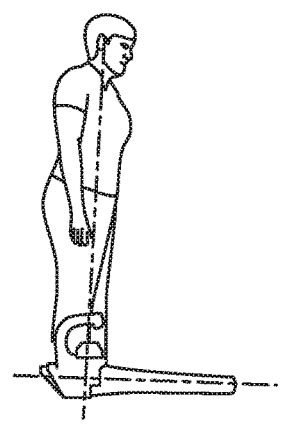 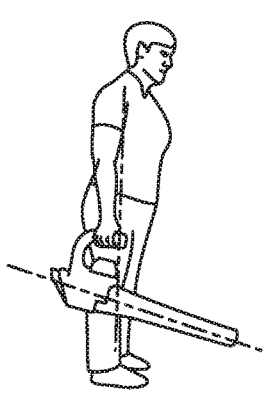
FIG. 7D

AXIAL-FAN BLOWER

CROSS-REFERENCE TO RELATED APPLICATIONS

This application claims the benefit of U.S. Provisional Application No. 62/132,018, filed on Mar. 12, 2015. The entire disclosure of the above application is incorporated herein by reference.

FIELD

The present disclosure relates to blowers, specifically axial-fan or in-line type blower designs.

BACKGROUND

Axial-fan or in-line type blowers are known in the prior art, and typically include a fan whose axis is aligned with the air outlet so that the airflow is not forced to undergo any significant turn or bend, thereby increasing airflow efficiencies.

An example of such a design is shows in U.S. Pub. No. 2012/0076672, which shows a blower having an air inlet opening 13, an axial blower or fan 6 and an outlet opening 15 that are, for the most part, linearly aligned so as to reduce any curves which may impede airflow. For cordless or battery powered blowers, the battery is often located at the rear of the blower where the air intake exists, and so this presents an issue since the battery must be moved so as not to obstruct the air intake.

Another example of an in-line blower is shown in US Pub. No. 2013/0239361, where the battery is not attached to the blower, but rather placed on a user's back. This design requires a harness to secure the battery to the user's back and requires an electrical cable which between the battery and blower, which can get tangled or otherwise impede the user's movement.

Yet another example is U.S. Pat. No. 4,884,314 where the batteries are integrally secured in the handle of the blower. This design has the disadvantage of not having a removable battery, which is desirable for charging and continuous use with multiple batteries.

Accordingly, there remains a need in the art for an in-line blower that is comfortable and easy to use.

SUMMARY

This section provides a general summary of the disclosure, and is not a comprehensive disclosure of its full scope or all of its features.

In one form, the present teachings provide a blower that includes an electric motor, a rotatable fan driven by the electric motor, a handle, a battery, and an airflow tube. The airflow tube is generally straight so that the airflow through the blower does not undergo any significant change in direction. Additionally, the handle, motor and fan are vertically aligned so that the center-of-gravity of the blower is below with the handle, reducing any moment forces on the user.

In another form, the blower includes a battery housing surrounding the battery to protect it from damage. The battery housing can be used to support the blower when placed on the ground or other surface, further protecting the blower housing from scuffing damage.

In yet another form, the battery housing can be secured to the blower housing at an angle so that it's resting position on the ground is identical to the in-use position so that a user can immediately use the blower when picked up without having to readjust his grip.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7A shows the position of the blower of the present invention, while on the ground and held by a user;

FIGS. 7B-7D show the position of prior art blower while on the ground and held be a user.

Corresponding reference numerals indicate corresponding parts throughout the several views of the drawings.

DETAILED DESCRIPTION

Figure 1:
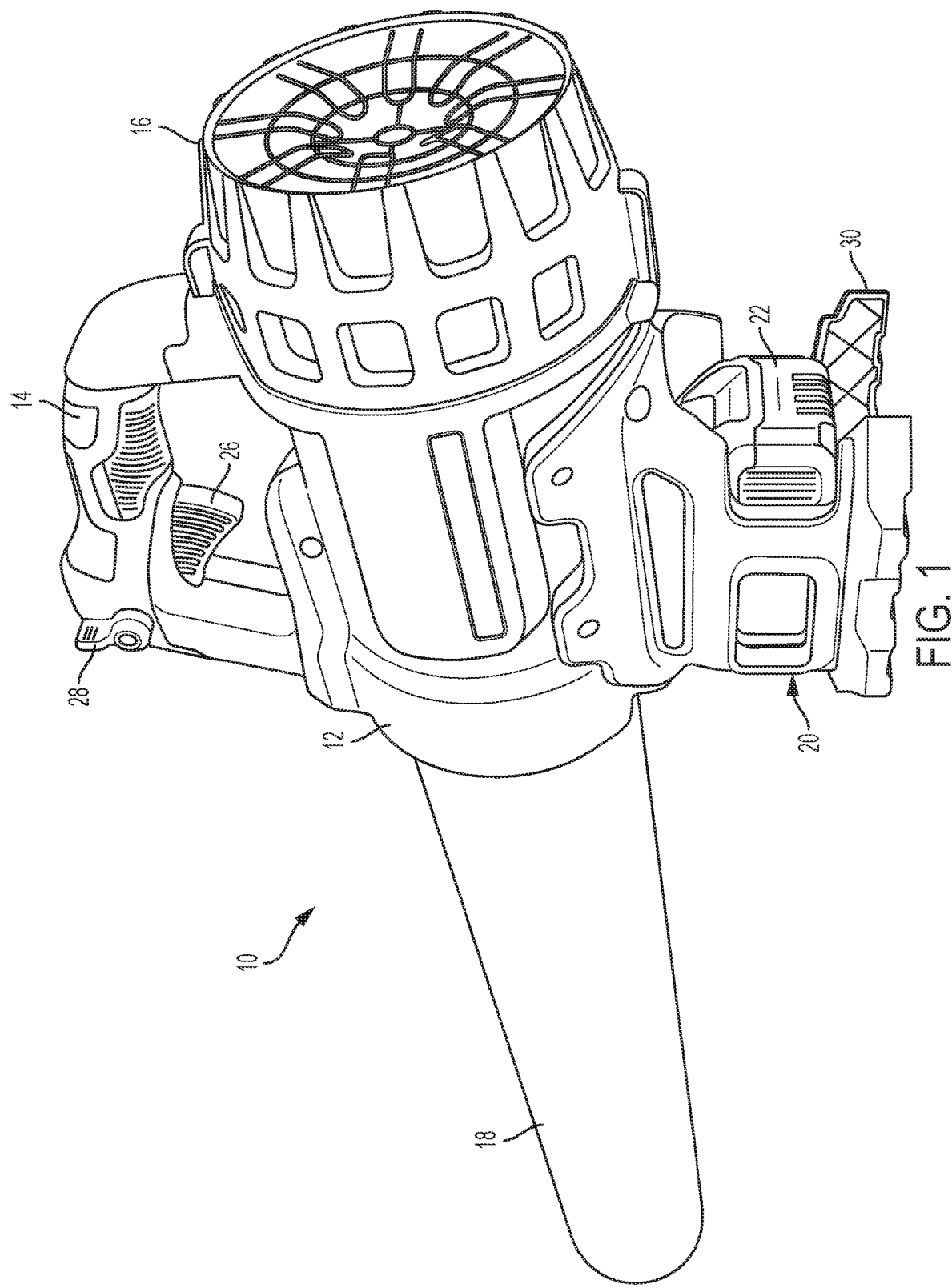
FIG. 1 is a perspective view of an exemplary blower constructed in accordance with the teachings of the present disclosure.
Figure 2:
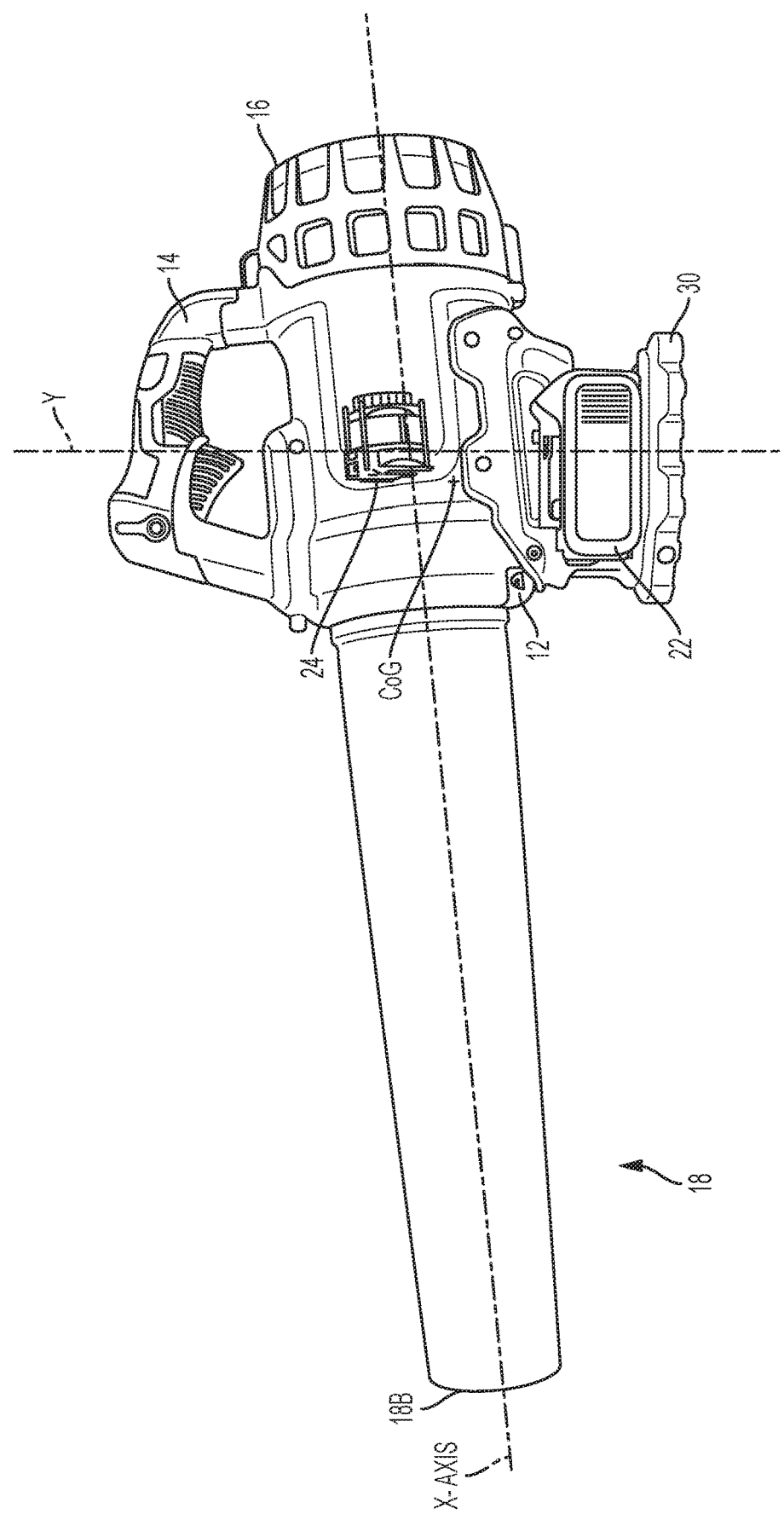
FIG. 2 is a side elevation view in partial section of the blower of FIG. 1.
Figure 2A:
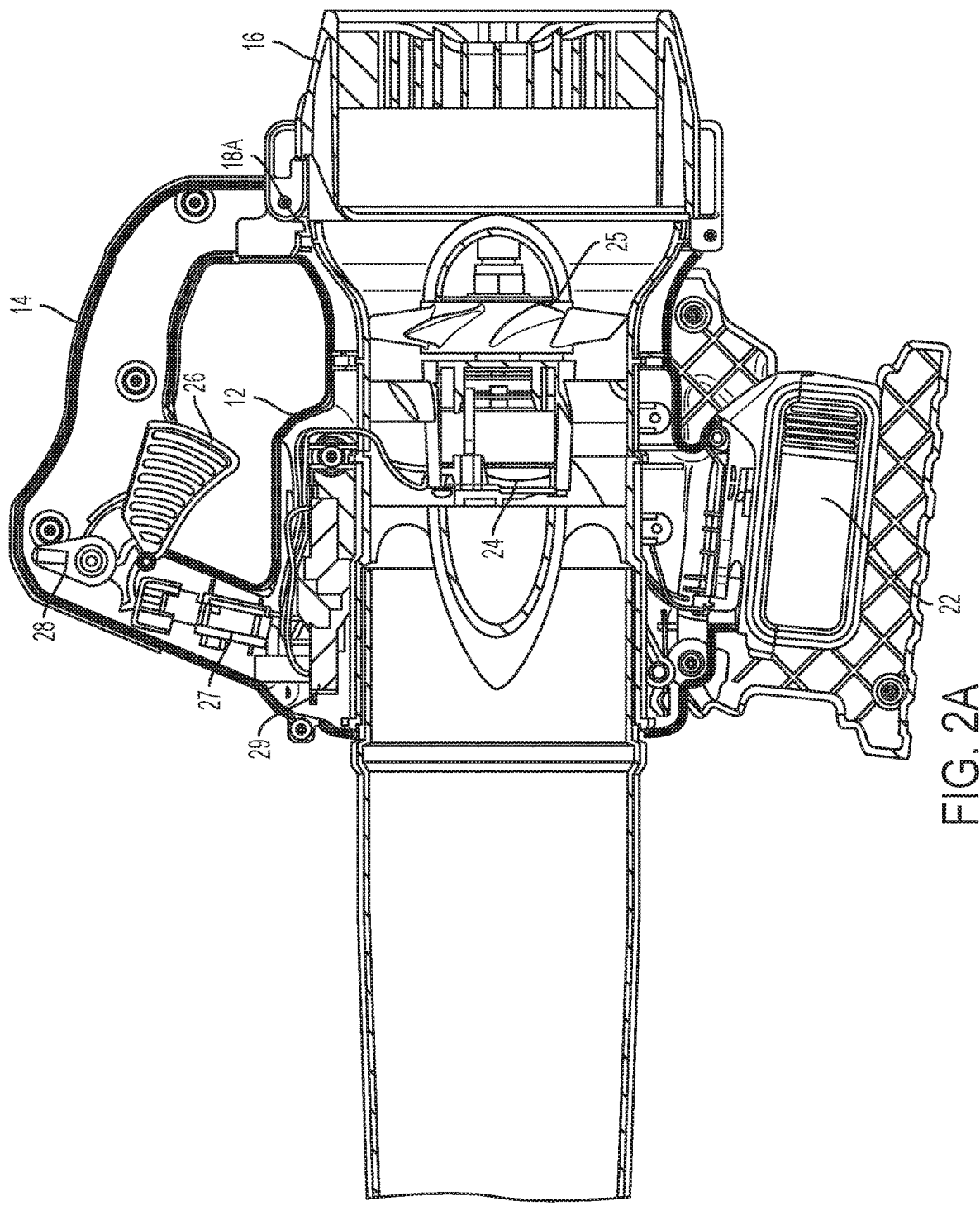
FIG. 2A is another side sectional view of the blower of FIG. 1.

With reference to FIGS. 1, 2 and 2A of the drawings, a blower constructed in accordance with the teachings of the present disclosure is generally indicated by reference numeral 10. The blower includes blower housing 12, a handle 14 positioned above the housing 12, and an air intake grill 16 at the rear of the housing 12. The housing 12 surrounds an airflow tube 18 which directs the airflow through the blower. The airflow tube 18 has a first end or inlet end 18A (shown in FIG. 2A) at the rear of the blower and is covered by the air intake grill 16. The airflow tube 18 has a second end or exhaust end 18B at a front end through which air exits the blower (shown in FIG. 2). A battery housing 20 is attached to the bottom of the housing and holds a battery 22.

Referring now to FIG. 2A, the battery 22 is electrically connected to a motor 24, positioned inside the blower housing 12, to deliver energy to the motor and drive fan 25. The fan 25 pulls air in through the air intake grill 16, through the fan 25, around the motor 24 and out through the exhaust end 18B of the airflow tube 18. As shown, airflow tube 18 is a substantially uniform body and provides a linear air path along the longitudinal direction of the blower, generally defined by the x-axis. The motor 24 and fan 25 are positioned within the airflow tube 18 in the path of the airflow so that their axes are parallel to the longitudinal axis of the blower. The tube 18 can be formed from a single integral body, or may be formed from several parts that are combined to form the body.

The blower includes a variable speed trigger 26 having a logic level switch 27. The switch is connected to a PCB 29 and the trigger distance determines the level of output from the switch, for example 0V-5V, that is then translated by the PCB 29 to output a corresponding voltage range to the motor 24, for example 0V-20V, that varies the speed of the motor 24, and consequently, controls the air speed through the blower. A speed lock 28 can mechanically lock the trigger 26 at a set speed to relieve the user from continually holding the trigger 26 in position.

Referring to FIG. 2A, the motor 24 and fan 25 are placed in the housing 12 below the handle 14. Additionally, the battery 22 is placed generally below the motor 24 so that the heaviest components of the blower are vertically aligned and the center-of-gravity (CoG) (as shown in FIG. 2) of the blower is directly below the handle 14. Having the CoG aligned with the handle provides many advantages. First, when the blower is held at a user's side, the weight of the blower is in line with the user's arm so that there is no moment acting on the user's hand. In other words, the blower does not tend to tip forward or backward, and so the user does not have to exert any force to keep the blower level or otherwise in position.

Figure 3:
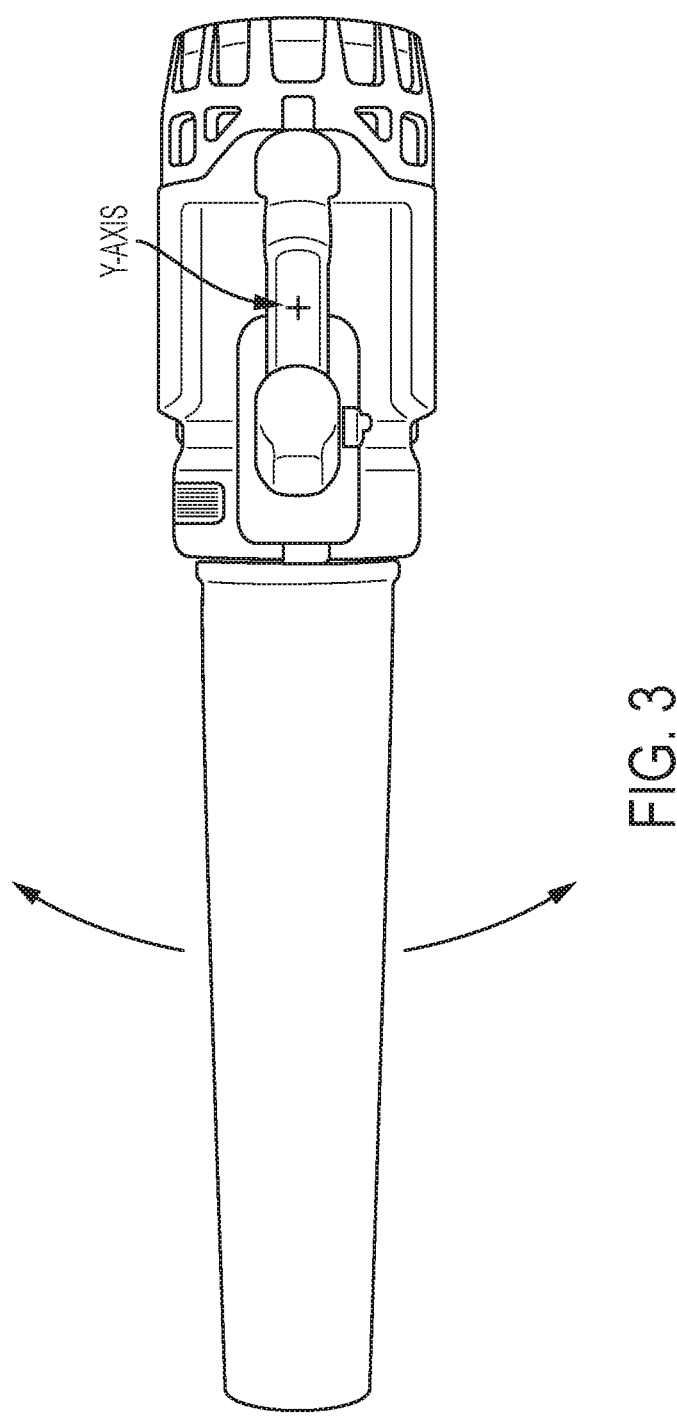
FIG. 3 is a top view of the blower of FIG. 1.

Second, since the weight of the unit is centered at the handle, this also reduces the force required to turn the blower side-to-side (rotate about the y-axis), as illustrated in FIG. 3. And third, the battery 22 acts as a ballast helping to maintain the blower in position in both the lateral direction (as shown in FIG. 4) and longitudinal direction.

Figure 5:
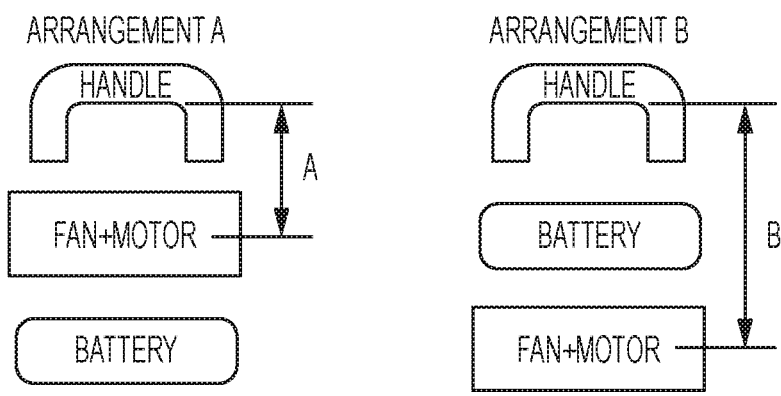
FIG. 5 is a schematic view of components of a blower.

In reference to FIG. 5, additional benefits of the arrangement of the handle 14, fan 25, motor 24, and battery 22 are seen. In addition to having the component vertically aligned, it is desirable to have the fan 25 as close to the handle 14 as possible to reduce any moment forces that are produced by the air exiting the airflow tube 18 (eg. the blower would tend to want to go backward in the user's hand). So for example, arrangement A is preferable over arrangement B, because when the fan 25 is operating, the air blowing out of the airflow tube 18 creates a moment partially determined by the distance between the handle and the fan 25. The greater this distance, the larger the moment forces created, which must be opposed by the user to maintain the blower in position. The distance A is less than distance B, and so produces small forces on the handle 14. Additionally, these same forces make it more difficult to control the blower when rotating it about the y-axis (see FIG. 3).

Figure 4:
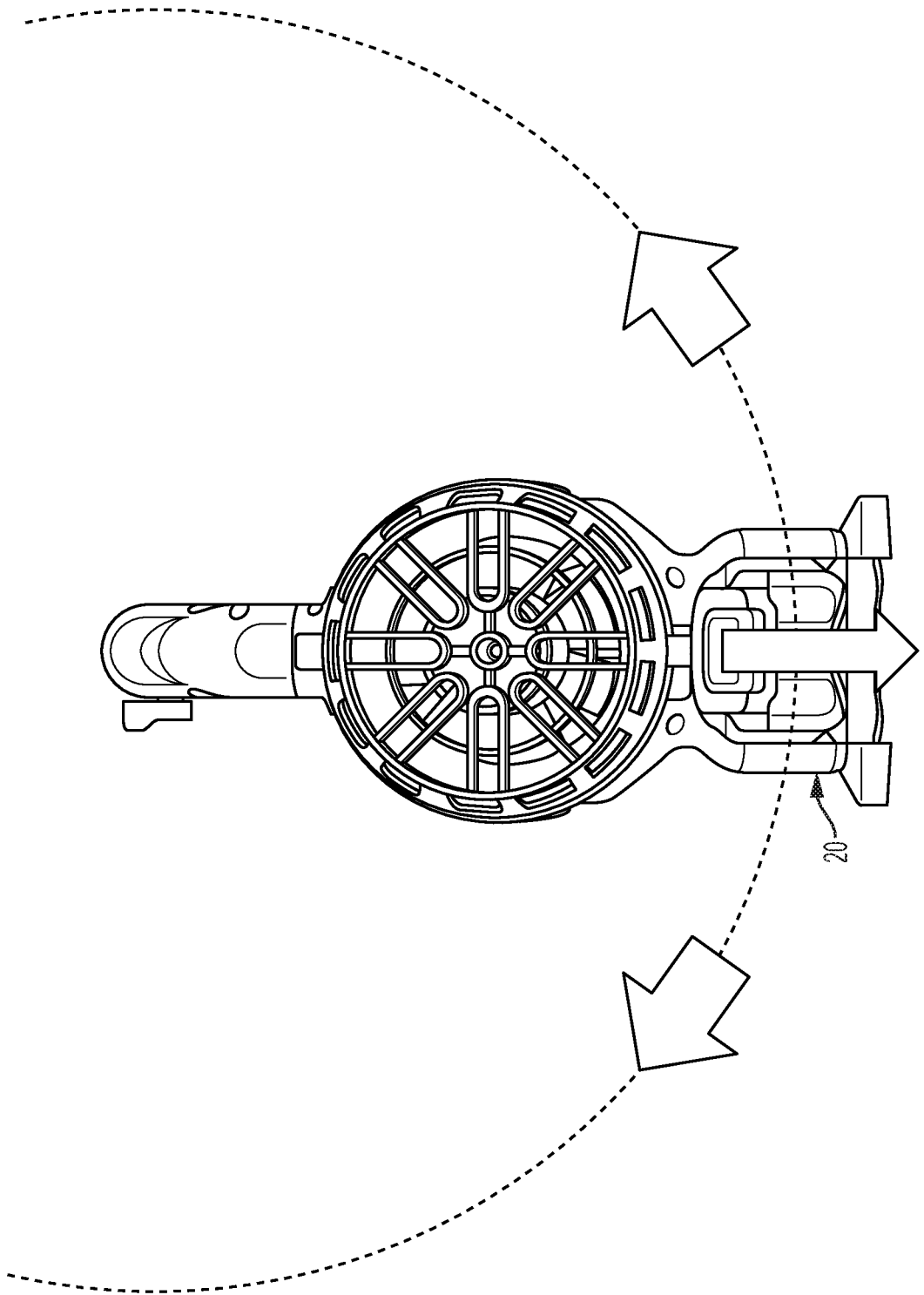
FIG. 4 is a rear view of the blower of FIG. 1.

Now referring to FIGS. 1 and 4, the battery housing 20 is molded from a durable plastic, for example glass-filled polypropylene, and attached to the housing 12 to support the blower when placed on the ground. The battery housing 20 is designed to withstand drops and endure daily wear and tear from being scraped and banged on the ground or other surface. The battery housing 20 includes a top wall, side walls, and a foot portion 30 that extends outwardly to provide a larger support surface for the blower.

Figure 6:
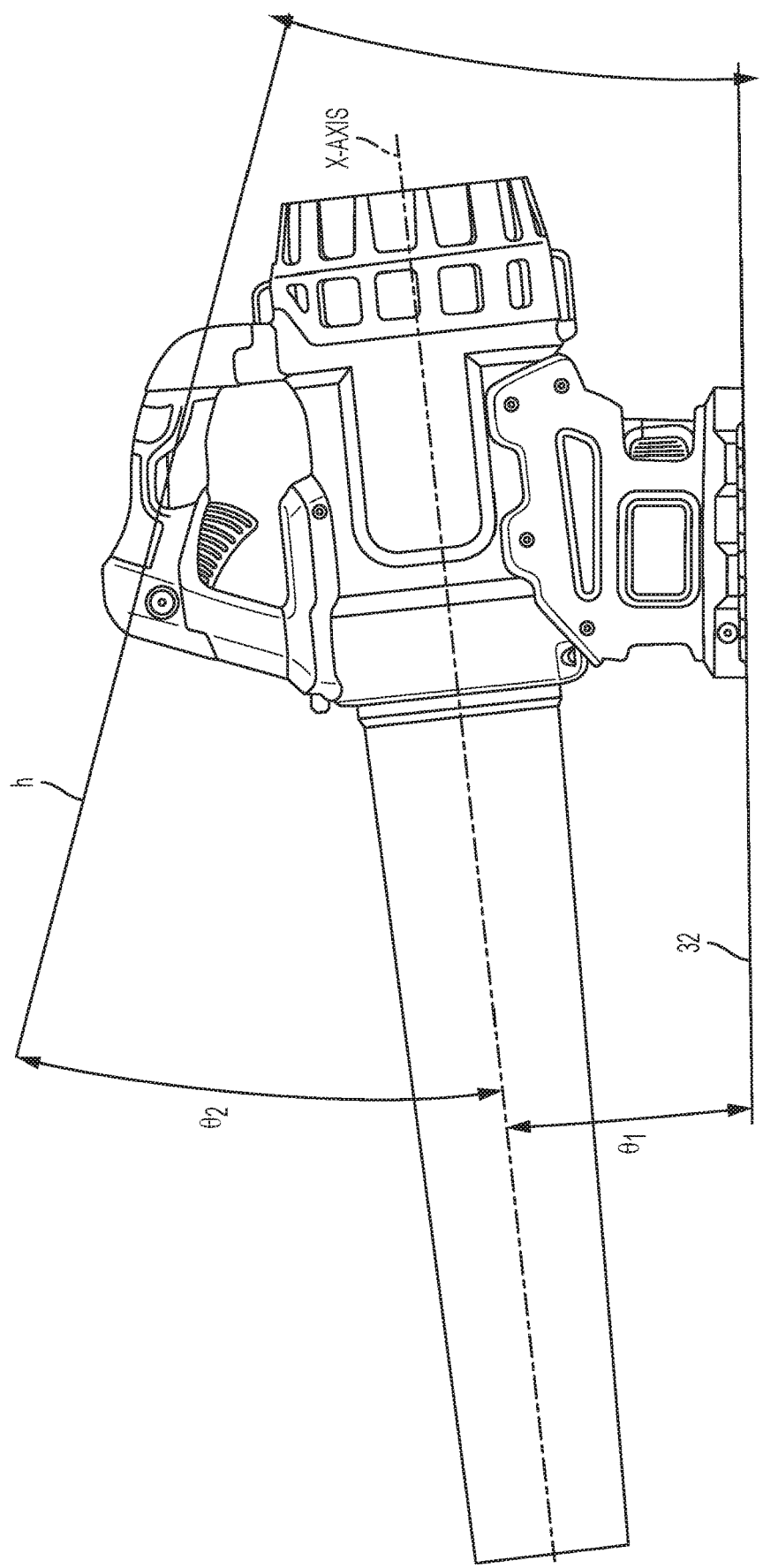
FIG. 6 is a side view of the blower of FIG. 1 placed on a surface.

Now referring to FIG. 6, it can be seen that the longitudinal axis of the blower housing 12 and the airflow tube 18, as identified by the x-axis, is at an angle $\theta_1$ relative to the ground surface 32 when the blower 10 is sitting on the ground. The angle $\theta_1$ is between 3-10 degrees, and in a preferred embodiment is approximately 5.6 degrees. Also, the longitudinal axis of the handle, as identified by h, is at an angle $\theta_2$ relative to the longitudinal axis x of the blower housing. The angle $\theta_2$ is between 15 and 25 degrees, and in a preferred embodiment is 20.5 degrees.

The angle of the blower housing 12 and handle 14 are such that the blower 10 is automatically in an in-use position when picked up by a user. This can be seen in FIG. 7A, where the angle of the blower housing 12 and airflow tube 18 are substantially similar in the in-use position held by the user, and when on the ground. Contrast this with FIGS. 7B-7D, which show examples of prior art units, where the angles of the exhaust tube are significantly different when sitting on the ground compared to the in-use position in the user's hand. This requires the user to then readjust his grip to get the blower in the proper position.

Figure 8:
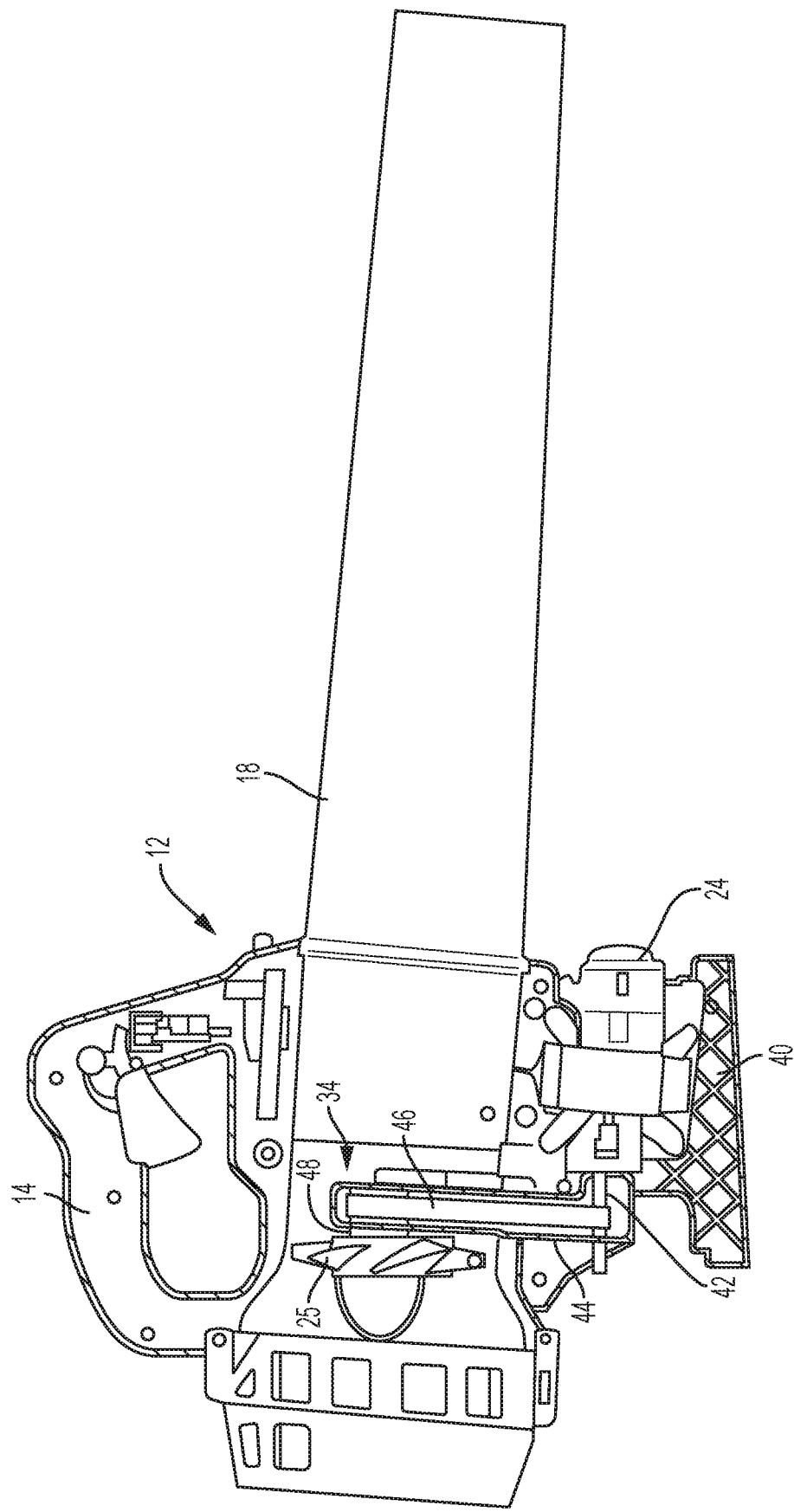
FIG. 8 is a side sectional view of an corded electric blower.

An alternative embodiment of the blower is shown in FIG. 8 where similar components are labeled with the same reference number. Here the electric blower does not require a battery and can be powered by alternative means, such as a power cord (not shown) attached to an outlet.

Here, the motor 24 has been moved out of the airflow tube 18 and positioned below the housing 12. The motor 24 is secured within a motor housing 40 below the main housing 12, or alternatively, the motor housing 40 can be formed integrally and as part of main housing 12. The motor 24 has a drive shaft 42 that is connected to a first end of a belt-drive or pulley system 34. The pulley system 34 is enclosed in a transmission casing 44, with a drive belt 46 therein, that connects the drive shaft 42 of the motor with a drive shaft 48 of the fan 25. In this way, rotation of the motor drive shaft 42 is transferred to the fan 25. In a preferred embodiment, the ratio of the pulley system is 1:1, but it should be understood that other ratios can be utilized.

The removal of the motor 24 out of the airflow tube 18 allows a larger motor to be used, since it won't be limited by the diameter of the airflow tube 18. Using larger motors, while maintaining fan size, and/or tube dimensions allows an optimized design for maximum airflow efficiency. This design also maintains the weight balance of the previous embodiment with the motor 24 acting as a ballast, helping to stabilize the blower when in use, similar to that described in the previous embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A blower comprising:
   a motor housing having a longitudinal axis along a length of the blower;
   a handle having a gripping portion positioned on a top portion of the motor housing and centered in a lateral direction of the motor housing, the gripping portion being capable of being grasped by a user's hand;
   an airflow tube extending from a front portion of the motor housing, the airflow tube having a longitudinal axis that is parallel with the longitudinal axis of the motor housing;
   a motor and a fan positioned within the motor housing, the motor driving the fan to blow air out of the airflow tube, the motor and fan positioned so that a majority of the motor and fan lie vertically aligned with and below the gripping portion; and
   a removable battery to provide power to the motor, the battery positioned below the motor housing at a center along the lateral direction of the motor housing so that the handle, the motor and the battery are substantially vertically aligned; and wherein the center of gravity of the blower is aligned below the gripping portion of the handle.

2. The blower of claim 1, wherein the blower is an inline blower, wherein air enters the blower at the motor housing and exits the blower through the airflow tube, wherein an airflow path is substantially straight through the blower.

3. The blower of claim 1, wherein the motor has a motor axis and the fan has a fan axis, and the motor axis and the fan axis are parallel to the longitudinal axis.

4. A blower comprising:
a motor housing having a longitudinal axis along a length of the blower;
a handle having a gripping positioned on a top portion of the motor housing and at a center along a lateral length of the motor housing, the gripping portion being capable of being grasped by a user's hand;
an airflow tube extending from a front portion of the motor housing, the airflow tube having a longitudinal axis that is parallel with the longitudinal axis of the motor housing;
a motor and a fan positioned within the motor housing, the motor driving the fan to blow air out of the airflow tube, the motor and fan positioned so that a majority of the motor and fan lie below the gripping portion; and
a removable battery to provide power to the motor, the battery positioned generally below the motor housing at a center along the lateral length of the motor housing so that the handle, motor and battery are substantially vertically aligned; and
wherein the blower includes a battery housing below the motor housing, the battery being removeably mounted in the battery housing, the battery housing supporting the blower when placed on a flat support surface.

5. The blower of claim 4, wherein the battery housing includes a foot portion extending outwardly from the battery housing, the foot portion supporting the blower on the support surface.

6. The blower of claim 5, wherein the handle forms a longitudinal axis, wherein the longitudinal axis of the handle relative to the longitudinal axis of the airflow tube is between 15-25 degrees.

7. An inline blower comprising:
a motor housing having a longitudinal axis;
a handle located on a top portion of the motor housing, the handle having a gripping portion being capable of being grasped by a user;
an airflow tube extending from a front portion of the motor housing, the airflow tube having a longitudinal axis that is parallel with the longitudinal axis of the motor housing;
a motor and a fan positioned within the motor housing, the motor having a motor axis and the fan having a fan axis, the motor axis and the fan axis being parallel with the motor housing longitudinal axis, the motor driving the fan to blow air out of the airflow tube, a majority of the fan is vertically aligned with and below the gripping portion; and
a removable battery to provide power to the motor, the battery positioned below the motor housing at a center along a lateral length of the motor housing so that the gripping portion, the fan and the battery are substantially vertically aligned; and
wherein the center of gravity of the blower is aligned below the gripping portion of the handle.

8. The blower of claim 7, wherein air enters the blower at a rear portion of the motor housing and exits the blower through the airflow tube, wherein an airflow path is substantially straight.

9. The blower of claim 8, further including a battery housing fixedly secured to a bottom portion of the motor housing and a battery located within the battery housing, the battery being removable from the battery housing.

10. The blower of claim 8, wherein when the blower is placed on a flat support surface, the longitudinal axis of the airflow tube forms an angle between 3 degrees and 10 degrees with the flat support surface.

11. An inline blower comprising:
a motor housing having a longitudinal axis;
a handle located on a top portion of the motor housing, the handle having a gripping portion being capable of being grasped by a user, an airflow tube extending from a front portion of the motor housing, the airflow tube having a longitudinal axis that is parallel with the longitudinal axis of the motor housing;
a motor and a fan positioned within the motor housing, the motor having a motor axis and the fan having a fan axis, the motor axis and the fan axis being parallel with the motor housing longitudinal axis, the motor driving the fan to blow air out of the airflow tube, a majority of the fan positioned generally below the gripping portion; and
a removable battery to provide power to the motor, the battery positioned below the motor housing at a center along a lateral length of the motor housing so that the gripping portion, fan and battery are substantially vertically aligned;
wherein air enters the blower at a rear portion of the motor housing and exits the blower through the airflow tube, wherein an airflow path is substantially straight;
further including a battery housing fixedly secured to a bottom portion of the motor housing and a battery located within the battery housing, the battery being removable from the battery housing; and
wherein the battery housing includes a foot portion that supports the blower on a support surface, the foot portion extending outwardly from the battery.

12. An inline blower comprising:
a motor housing;
an airflow tube extending from a front portion of the motor housing, the airflow tube having a central axis;
a handle positioned on a top portion of the motor housing;
a fan positioned within the motor housing, the fan having a fan axis that is parallel to the central axis;
a motor positioned in the motor housing, the motor having a motor axis that is parallel to the central axis, the motor driving the fan to blow air out of the airflow tube;
a battery housing positioned below the motor housing for supporting the blower on a support surface; and
a battery to power the motor, the battery removably located in the battery housing at a center along a lateral length of the motor housing.

13. The blower of claim 12, wherein the motor is connected to the fan using a belt drive system.

14. The blower of claim 12, wherein air enters the blower at the motor housing and exits the blower through the airflow tube, wherein an airflow path is substantially straight.

15. The blower of claim 14, wherein the motor housing defines an inlet plane that is perpendicular to the airflow path.

16. The blower of claim 12, wherein the battery housing includes a foot portion that extends outwardly from the battery housing for supporting the blower.

17. The blower of claim 12, wherein the airflow tube has a longitudinal axis, and the handle forms a longitudinal axis, wherein the longitudinal axis of the handle relative to the longitudinal axis of the airflow tube is between 15-25 degrees.

\* \* \* \* \*